United States Patent
Dixon

[15] 3,686,785
[45] Aug. 29, 1972

[54] FISHING DEVICE
[72] Inventor: John L. Dixon, 323 Hawthorne Court, Lake Bluff, Ill. 60044
[22] Filed: Feb. 26, 1971
[21] Appl. No.: 119,139

[52] U.S. Cl. ..................................... 43/15, 43/21.2
[51] Int. Cl. ............................................ A01k 97/00
[58] Field of Search ............................... 43/15, 21.2

[56] References Cited

UNITED STATES PATENTS

| | | | |
|---|---|---|---|
| 693,071 | 2/1902 | Ruud | 43/15 |
| 2,295,250 | 9/1942 | Zenewich | 43/15 |
| 2,642,690 | 6/1953 | Soenksen | 43/15 |
| 2,835,066 | 5/1958 | Spilker | 43/21.2 |
| 2,918,746 | 12/1959 | Hamrick | 43/15 |

*Primary Examiner*—Samuel Koren
*Assistant Examiner*—Daniel J. Leach
*Attorney*—Edward L. Benno

[57] ABSTRACT

A fishing device for holding a fishing pole or rod and setting the hook upon a fish taking the bait or hook comprising an arm pivotally mounted about a vertical axis on a support member secured to a boat gunwale. The arm includes holder means to releasably support the fishing rod thereon. A coiled spring is connected between the inner end of the arm and the support member and is held tensioned by a flexible member having a hook on one end engaging an eyebolt in the outer end of the arm. The fishing line engages the hook and a pull on the line releases the hook, causing the spring to jerk the arm and rod to set the hook in the fish's mouth.

7 Claims, 2 Drawing Figures

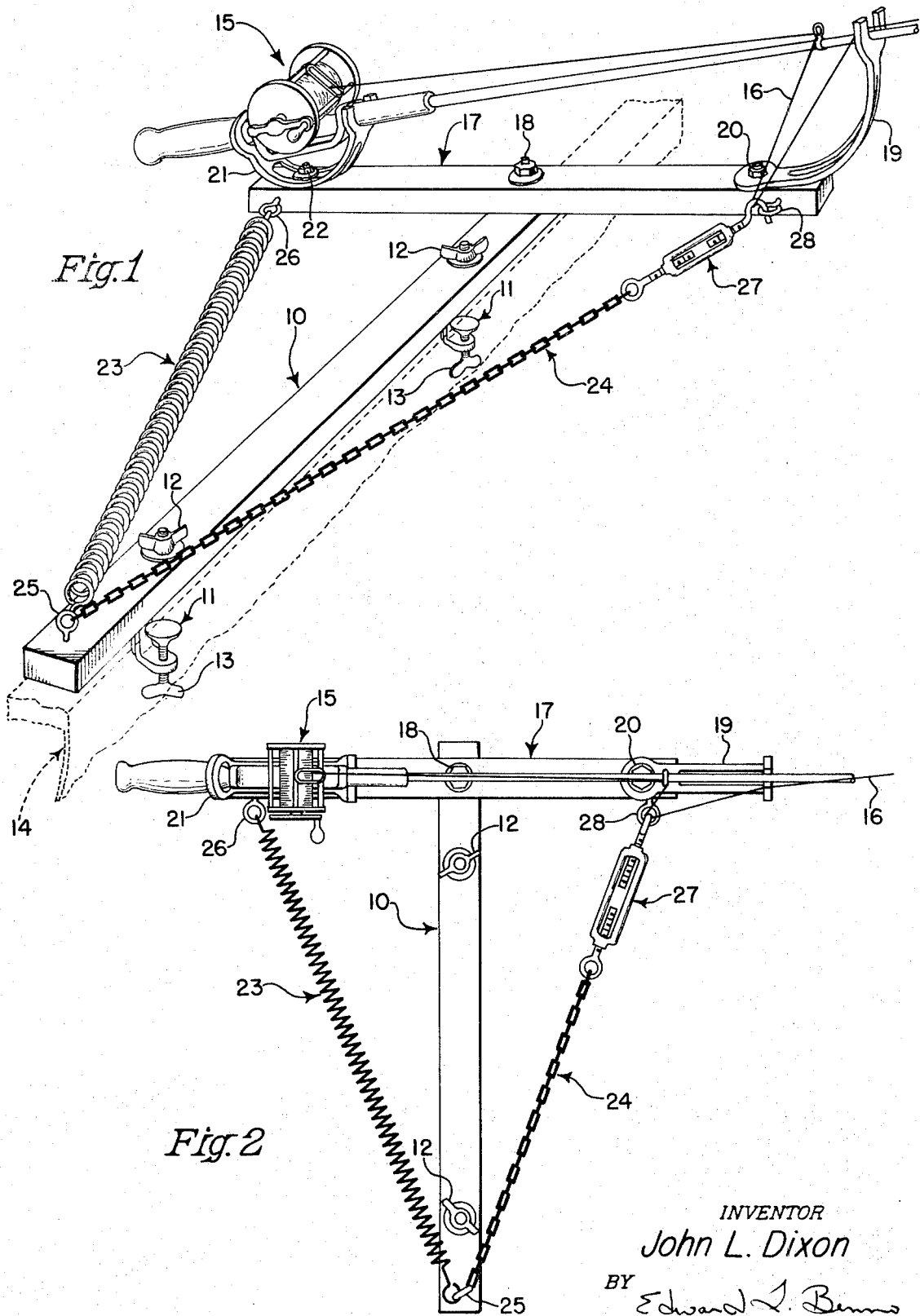

FISHING DEVICE

SUMMARY OF THE INVENTION

Prior art devices for holding a fishing pole and for setting the hook when the fish takes the bait or hook are not easily adapted or efficient for trolling from a moving boat because they generally operate in a vertical direction, are complicated in construction, and difficult to operate and control.

It is the principal object of the present invention to provide an improved fishing device ideally arranged for trolling from a moving boat, which is actuated upon a fish taking the hook as the line is trailed through the water, which is easily adjusted for a wide range of fishing conditions, and which permits the fisherman to quickly remove the rod or pole from the device for bringing in the fish. The various fishing conditions contemplated by the invention are various rod sizes and weights of line, different sizes and weight of the lures or baited hooks, and varied speeds of trolling. All of these various conditions produce a wide range of drag on the line in trolling and the device must be capable of easy adjustment or compensation to prevent accidental or false operation during trolling under widely varied drag conditions. In addition to the drag conditions, an important interrelated condition is that of the hook setting force. The hook setting force must be such that under any particular drag conditions a sensitive yet positive operation of the device occurs to properly set the hook.

It is a further object of the invention to provide a simple fishing device according to the principal object which is further easily arranged for trolling from either side of a moving boat.

It is still another object to provide in a fishing device according to the preceding objects, an arrangement whereby the device may be used for still fishing under certain conditions.

Other objects and features of the invention will be apparent upon a perusal of the following specification and drawing in which:

FIG. 1 is a perspective view of a fishing device constructed according to the invention; and FIG. 2 is a top plan view of the structure shown in FIG. 1.

The present embodiment is the preferred embodiment, but it is to be understood that changes can be made in the present embodiment by one skilled in the art without departing from the spirit and scope of the present invention.

DESCRIPTION OF PREFERRED EMBODIMENT

Referring to the drawing it may be seen that the invention comprises a longitudinal support member 10 which is provided with a pair of clamps 11. The clamps 11 are secured by a pair of wing nuts 12 to the support member 10 in a longitudinally spaced apart relationship, and to depend from the support member 10. The lower ends of the clamps 11 carry thumb screws 13 so that the support member 10 may be secured in a substantially horizontal position on the gunwale of a boat or the like. In the arrangement of the invention shown in the drawing the support member 10 is intended to be mounted on the starboard side of a boat. A portion of the boat is shown in dotted lines and indicated at 14. It should be understood that in such an arrangement the boat 14 in trolling would generally be moving in a direction somewhat inwardly of the drawing as viewed in FIG. 1 with the fisherman generally seated in the boat and facing in the opposite direction from that in which the boat is moving. The fisherman is also generally seated adjacent to the handle of the fishing pole shown at 15. It should further be understood that the line 16 with the hook on the end thereof is trailed from the end of the pole 15 to extend in a direction somewhat outwardly of the drawing as viewed in FIG. 1.

The only other basic support member of the invention is the support arm 17. The support arm 17 is a longitudinal member and is pivotally mounted substantially at the longitudinal center thereof on one end of support member 10 by the fastener 18. It may be seen from the drawing that the arm 17 is pivotally carried in a substantially horizontal plane immediately above the support member 10.

On the outboard end of the arm 17 a fishing pole or rod supporting bracket 19 is provided. The bracket 19 is secured to the arm 17 by the fastener 20 and upstands therefrom. The upper end of the bracket 19 is bifurcated to receive and support the fishing pole 15 intermediate the ends thereof.

On the inboard end of the arm 17 a pole or rod holder 21 is provided. The holder 21 is secured to the arm 17 by the fastener 22 and upstands therefrom in a generally U-shaped arrangement. The rearward or inboard end of the holder 21 is provided with a hole therethrough for receiving the handle of the fishing rod 15. The forward or outboard end of the holder 21 is bifurcated to receive the forward end of the handle of the fishing rod 15. It is apparent from the drawing that the fishing rod 15 is easily removed from the device of the invention by simply raising the rod from the bifurcated portions of the bracket 19 and the holder 21 and moving the handle of the rod out of the hole in the holder 21. The rod 15 is also easily received and supported by the device of the invention by inserting the handle of the rod through the hole in the holder 21 and then lowering the rod into the bifurcated portions of the holder 21 and bracket 19. It is apparent from the foregoing that when the rod 15 is supported in the device of the invention, the rod 15 is pivotally movable in a substantially horizontal plane about the axis of the fastener 18.

The device of the invention further comprises a coiled spring 23 and a chain, cable or the like 24. One end of the coiled spring 23 is removably hooked to an eyebolt 25. The eyebolt 25 is carried to upstand from the end of the support member 10 opposite from the end carrying the fastener 18. The other end of the coiled spring 23 is removably hooked to an eyebolt 26. The eyebolt 26 is secured in the side and at the end of the arm 17 carrying the holder 21. The eyebolt 26 is substantially in the same horizontal plane as the arm 17 and eyebolt 25.

One end of the chain, cable or the like 24 is removably hooked to the eyebolt 25. The other end of the chain 24 is secured to one end of a turnbuckle 27. The other end of the turnbuckle 27 is provided with a hook portion in which the end of the hook is substantially straight so that the longitudinal axis of the straight end is substantially perpendicular to the longitudinal axis of the turnbuckle 27. That hook portion of the turnbuckle 27 is intended to cooperate with an eyebolt 28. The eyebolt 28 is secured in the side and at the end of the arm 17 carrying the bracket 19. The eyebolts 26 and 28 are on the same side of the arm 17. The turnbuckle 27 in cooperation with the coiled spring 23 determines the amount of drag on the line 16 which will not cause operation of the device, and the hook setting force of the device.

When the arm 17 is manually moved to a position generally transversely of the support member 10, as viewed in the drawing, the coiled spring 23 is stretched or tensioned. The hook portion of the turnbuckle 27 is then caused to engage a loop in the line 16, and the hook portion is then inserted in the eyebolt 28 with the straight end of the hook portion extending downwardly through the eyebolt 28. By adjusting the turnbuckle 27 to increase or decrease its length, the tension of the coiled spring 23 is varied.

When a fish takes the hook or bait on the end of the line 16, a tug occurs on the line 16 over and above the drag of line 16 through the water. The line 16 will then pull or move the hook portion of the turnbuckle 27 upwardly out of engagement with the eyebolt 28. The disengaging movement of the hook portion occurs relatively rapidly, and the turnbuckle 27 and chain 24 are flipped out of the loop of the line 16. The coiled spring 23 will then jerk the arm 17 and the rod 15 carried thereon in a counterclockwise direction as viewed in FIG. 2. As the jerking movement of the arm 17 is initiated, the slack in the loop of line 16 is taken up, and as the arm 17 gains its maximum speed in the noted counterclockwise direction the setting action of the hook in the mouth of the fish occurs. The fisherman may then quickly remove the rod 15 from the device of the invention and play or otherwise bring in his fish.

Although the device of the invention has been shown and described as mounted on the starboard side of a boat, it is contemplated that the described elements may also be assembled and arranged for mounting on the port side of a boat. In a port mounting arrangement, the clamps 11 are rotated through an angle of 180°. Further, the positions of the bracket 19 and the holder 21 on the arm 17 are reversed, and the coiled spring 23 is hooked into eyebolt 28 rather than in eyebolt 26. Lastly, the hook portion of the turnbuckle 27 is hooked into the eyebolt 26 rather than in eyebolt 28.

It is further contemplated that under certain conditions, such as in water having a current sufficient to produce drag on the line 16, the device of the invention may be used for still fishing.

It may be seen from the foregoing description that the device of the invention in a disassembled condition may be stored or transported in a relatively small and compact arrangement. It may further be noted that because of the simple construction and arrangement of elements, the device of the invention may ideally be packaged and sold in a disassembled condition.

I claim:

1. A fishing device for holding a fishing rod and setting the hook wherein the fishing line carrying the hook is disposed in a generally horizontal direction away from the rod with drag on the line in that direction comprising, a substantially longitudinal supporting member, means for mounting said supporting member in a substantially horizontal plane, a substantially longitudinal arm, means pivotally carrying said arm substantially at the longitudinal center thereof on one end of said supporting member for pivotal movement of said arm in a substantially horizontal plane immediately above the horizontal plane including said support member, a holder for the handle end of a fishing rod mounted on one end of said arm, a bracket for supporting said rod intermediate the ends thereof mounted on the other end of said arm, a coiled spring connected between the other end of said supporting member and said one end of said arm, a flexible element having one end connected to said other end of said supporting member, a hook member, means for carrying said hook member on the other end of said flexible member, hook receiving means carried on said other end of said arm for receiving said hook member and releasing said hook member upon substantially upward movement of said hook member, said holder and said bracket positioned on said arm so that a line on said fishing rod between said holder and said bracket is capable of being looped about said hook member to move said hook member upwardly responsive to a tug on said line, and said coiled spring and said flexible element having relative lengths so that said arm is positioned substantially transversely of said support member and said coiled spring is tensioned when said hook member is positioned in said hook receiving means.

2. In a device as defined in claim 1, wherein said means for mounting said supporting member in a substantially horizontal plane comprises a plurality of clamps depending from said supporting member, and said clamps being formed for clamping said supporting member in a substantially horizontal plane over the gunwale of a boat.

3. In a device as defined in claim 1, wherein said means for carrying said hook member on the other end of said flexible member comprises adjustable means for varying the distance between said hook member and said other end of said flexible member.

4. In a device as defined in claim 3, wherein said flexible element comprises a chain-like element, and said adjustable means and hook member comprise a turnbuckle wherein one end of said turnbuckle is connected to said other end of said chain-like element and the other end of said turnbuckle is formed in the shape of a hook.

5. In a device as defined in claim 4, wherein said hook receiving means and the connection of said coiled spring to said arm comprise substantially identical eyebolts secured in the vertical side of said arm toward said other end of said supporting member and at the opposite ends thereof.

6. In a device as defined in claim 5, wherein the connection of said coiled spring to said other end of said supporting member and the connection of said chain-like element to said other end of said supporting member comprise a common eyebolt carried on the upper side of and at said other end of said supporting member substantially in the horizontal plane including said arm and said substantially identical eyebolts.

7. In a device as defined in claim 6, wherein the end of said hook is substantially straight and the eyebolt associated therewith is arranged so that when said hook is received in said eyebolt the straight end of said hook is positioned substantially vertically in said eyebolt in a direction permitting said hook to be released from said eyebolt upon upward movement of said hook.

* * * * *